United States Patent [19]
Neuberger

[11] Patent Number: 5,602,386
[45] Date of Patent: Feb. 11, 1997

[54] OPTICALLY POWERED REMOTE MICRO DEVICES EMPLOYING FIBER OPTICS

[75] Inventor: Wolfgang Neuberger, Monchen-Gladbach, Germany

[73] Assignee: Ceramoptec Industrues, Inc., East Longmeadow, Mass.

[21] Appl. No.: 522,994

[22] Filed: Sep. 1, 1995

Related U.S. Application Data

[63] Continuation of Ser. No. 301,695, Sep. 7, 1994, abandoned.

[51] Int. Cl.$^6$ .............................. H02K 7/00; G02B 6/00
[52] U.S. Cl. ................ 250/227.11; 250/216; 310/306
[58] Field of Search ..................... 250/227.11, 227.24, 250/227.28, 216; 310/306, 307

[56] References Cited

U.S. PATENT DOCUMENTS

| | | | |
|---|---|---|---|
| 4,742,678 | 5/1988 | Bartholemew et al. | 60/516 |
| 5,412,265 | 5/1995 | Sickafus | 310/254 |
| 5,428,259 | 6/1995 | Suzuki | 310/309 |

Primary Examiner—Edward P. Westin
Assistant Examiner—John R. Lee
Attorney, Agent, or Firm—Bolesh J. Skutnik

[57] ABSTRACT

Optical energy, generated by a laser or laser diode source, is coupled into an optical fiber having core dimensions typically ranging from 5 to 200 micrometers. Overall outside dimensions of such fibers range between 50 and 500 micrometers. With such fibers, optical energy can be transmitted with minimal losses over distances of several meters to several hundred meters. Power levels of 1 to 100 Watts can be transmitted without problems. With such power available a wide variety micro machines and other miniature devices can be operated by converting the optical energy into mechanical energy through thermodynamic or photoacoustical means. Preferably transmitted wavelengths will match an absorption peak of a thermodynamic work medium thereby providing efficient conversion from optical to mechanical energy. An alternative method uses an optomechanical conversion means to generate mechanical power at a remotely situated micro machine or micro actuator. Pulsed or continuous lasers and laser diodes may be employed depending on application specifics.

13 Claims, 5 Drawing Sheets

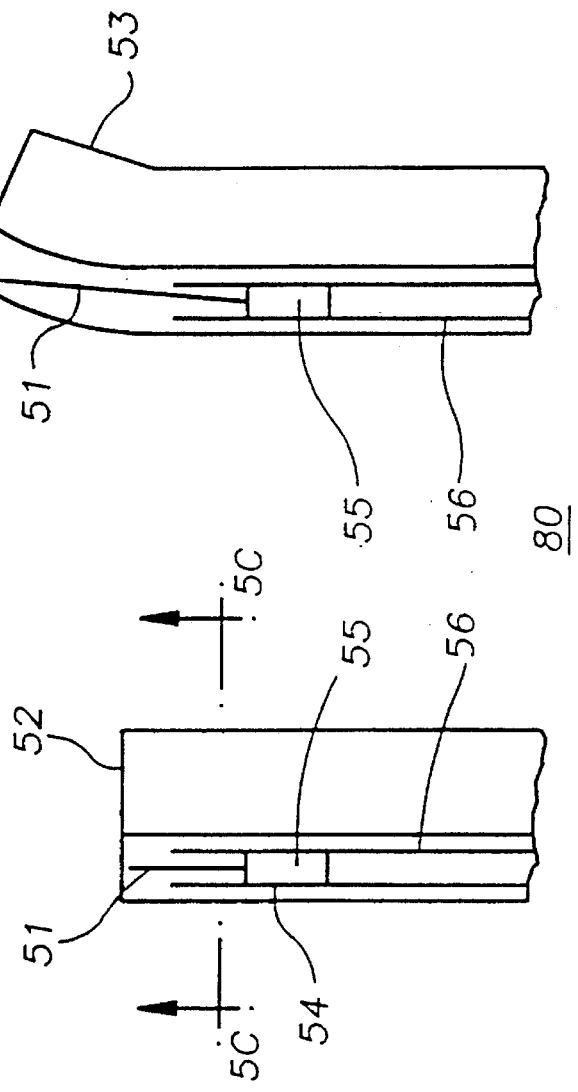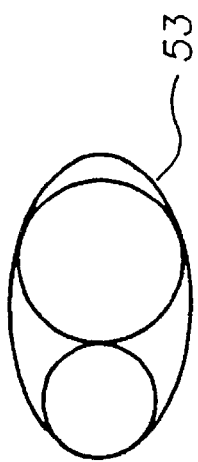

OPTICALLY POWERED REMOTE MICRO DEVICES EMPLOYING FIBER OPTICS

This is a continuation of application Ser. No. 08/301,695, filed Sep. 7, 1994, now abandoned.

BACKGROUND

The invention relates generally to the provision of power to micro devices such as micro machines and micro actuators. In particular, it deals with activation of micro devices by optical radiation transmitted through optical fibers.

Micro machines and micro actuators are becoming well known in the technical world. Typically they are miniature mechanisms with dimensions ranging from 100 micrometers to several millimeters.

Their manufacture became possible with the advent of new technologies such as the various micro lithographic techniques developed for the semiconductor industry. As improvements are made in these technologies, ever smaller and more complex machines and structures are becoming possible on a microscopic scale.

At present, micro devices are typically powered by electricity. While electrical motor drives are generally convenient, transmission of electrical energy becomes increasingly difficult as cable cross sectional area decreases and distances increase between power source and device.

It is well established from physics that a wire's resistance increases as its length increases and as its cross sectional area decreases. To maintain a fixed power or electrical current as distances increase and cross sectional areas decrease, thus requires that the voltage be significantly increased. With ever finer wires required for smaller and smaller devices and with a desire to further remote the power source from the active element, higher and higher voltages are required as for example in small piezoelectric drives. Problems arise as voltages increase because shielding the electrical circuit from surroundings, which are typically grounded, becomes more important but also more difficult to achieve in small packaging.

The principles of electromagnetic theory thus make it very difficult to use present state of the art micro devices in remote areas where only small access channels are available. A particularly difficult application would be using micro devices inside a human body, where, additionally from first principles, electrical signals and power may be undesirable.

An alternative power transmission principle, which can reduce electrical safety concerns, would be a mechanical, rotating shaft. In fact, such mechanical devices are used for instance to remove plaque from calcified arteries. This approach, however, also has problems as device dimensions and available transmission channels become restricted. Stiffness and torque resistance of the transmission shaft limit power available to the remote device.

BRIEF SUMMARY OF THE INVENTION

It is, therefore, the aim of the present invention to minimize restrictions on dimensions and on distance by employing optical radiation as a power source and transmitting power to a micro device by an optical fiber.

It is a further aim of the present invention to provide a system that enables safe and biocompatible operation of micro devices inside a human body.

Briefly stated, in the present invention, optical energy, generated by a laser or laser diode source, is coupled into an optical fiber having core dimensions typically ranging from 5 to 200 micrometers. Overall outside dimensions of such fibers range between 50 and 500 micrometers. With such fibers, optical energy can be transmitted with minimal losses over distances of several meters to several hundred meters. Power levels of 1 to 100 Watts can be transmitted without problems. With such power available a wide variety micro machines and other miniature devices can be operated by converting the optical energy into mechanical energy through thermodynamic or photoacoustical means. Preferably, transmitted wavelengths will match an absorption peak of a thermodynamic work medium, thereby providing efficient conversion from optical to mechanical energy. An alternative method uses an optomechanical conversion means to generate mechanical power at a remotely situated micro device. Pulsed or continuous lasers and laser diodes may be employed depending on application specifics.

The above, and other objects, features and advantages of the present invention will become apparent from the following description read in conjunction with the accompanying drawings, in which like reference numbers in different drawings denote like items.

BRIEF DESCRIPTION OF DRAWINGS

FIG. 5 shows, in cross sectional view, a distal end of a mini endoscope articulated by means of a micro actuator.

BRIEF DESCRIPTION OF PREFERRED EMBODIMENTS

Figure 1:
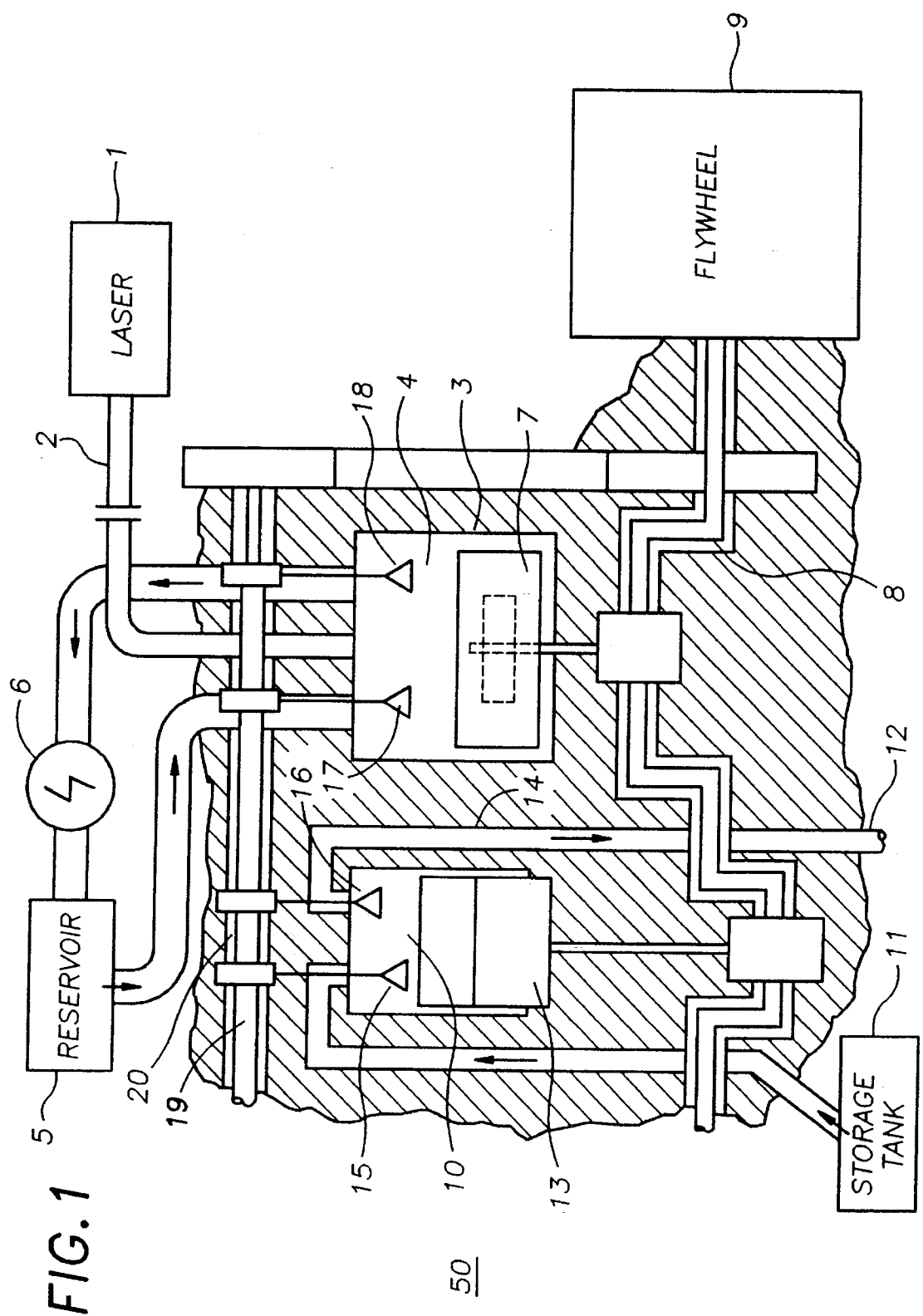
FIG. 1 shows a fiberoptic linked piston micro pump in cross-sectional view.

Referring to FIG. 1, a micro pump 50 is shown as a laser pulse from laser 1 is vaporizing work medium 4. Pulsed laser 1 is coupled into an optical fiber 2 that leads to a cylinder 3. A laser wavelength is selected such that it is highly absorbed by a thermodynamic work medium 4 within cylinder 3. On absorption of optical energy from laser 1, work medium 4 changes its aggregate state from liquid to vapor. Vaporized work medium 4 pushes piston 7 downwards partially transferring mechanical energy to flywheel 9 through crankshaft 8. A reservoir 5 of work medium 4 is situated between cylinder 3 and a condenser 6 wherein exhausted vapor changes back to a liquid. In micro pump 50, as a section of crankshaft 8 is forced into motion by vaporizing work medium 4, another section pumps a second medium 10 from storage tank 11 to outlet 12 by means of a second piston 13 in a second cylinder 14. Inlet valves 15 for cylinder 14, and 17 for cylinder 3 and outlet valves 16 for cylinder 14, and 18 for cylinder 3 are controlled by camshafts 19 and 20 respectively.

Once one understands the power transfer mechanism of the present invention and the consequences of size and remote operation, micro pump 50 functions quite similarly to its macroscopic counterparts. Macroscopic machines are typically driven by fuel combustion. This would be virtually impossible to do on a microscopic scale, particularly, for example, if the machine operates within the human body.

Micro applications are not as concerned with overall energy efficiency as classical engineering is for microscopic applications. Inefficient energy sources such as lasers, which in some cases may be only 1% efficient, can be used if sufficient energy can be transferred efficiently to where it is needed.

In one preferred embodiment of the present invention, a laser, as in FIG. 1, operating at 2.69 micrometer wavelength is used as an optical energy source 1. Water is used as a work medium 4 because it absorbs strongly at this wavelength. Another advantage of this wavelength is that fused silica optical fibers can transmit power over distances of 1 or 2 meters, without prohibitively high transmission losses, provided OH content of the fibers is kept below 0.1 to 0.2 ppm. Distances of 1–2 meters permit placement of a micro pump 50 inside a human body to pump a drug or other infusion medium 10 in a controlled manner at a designated application site.

In other embodiments several cylinders could be used instead of a single powering cylinder. Each cylinder would be linked to an optical fiber. Other work mediums can be used as long as an operating wavelength of an optical energy source is absorbed strongly by the work medium.

Figure 2:
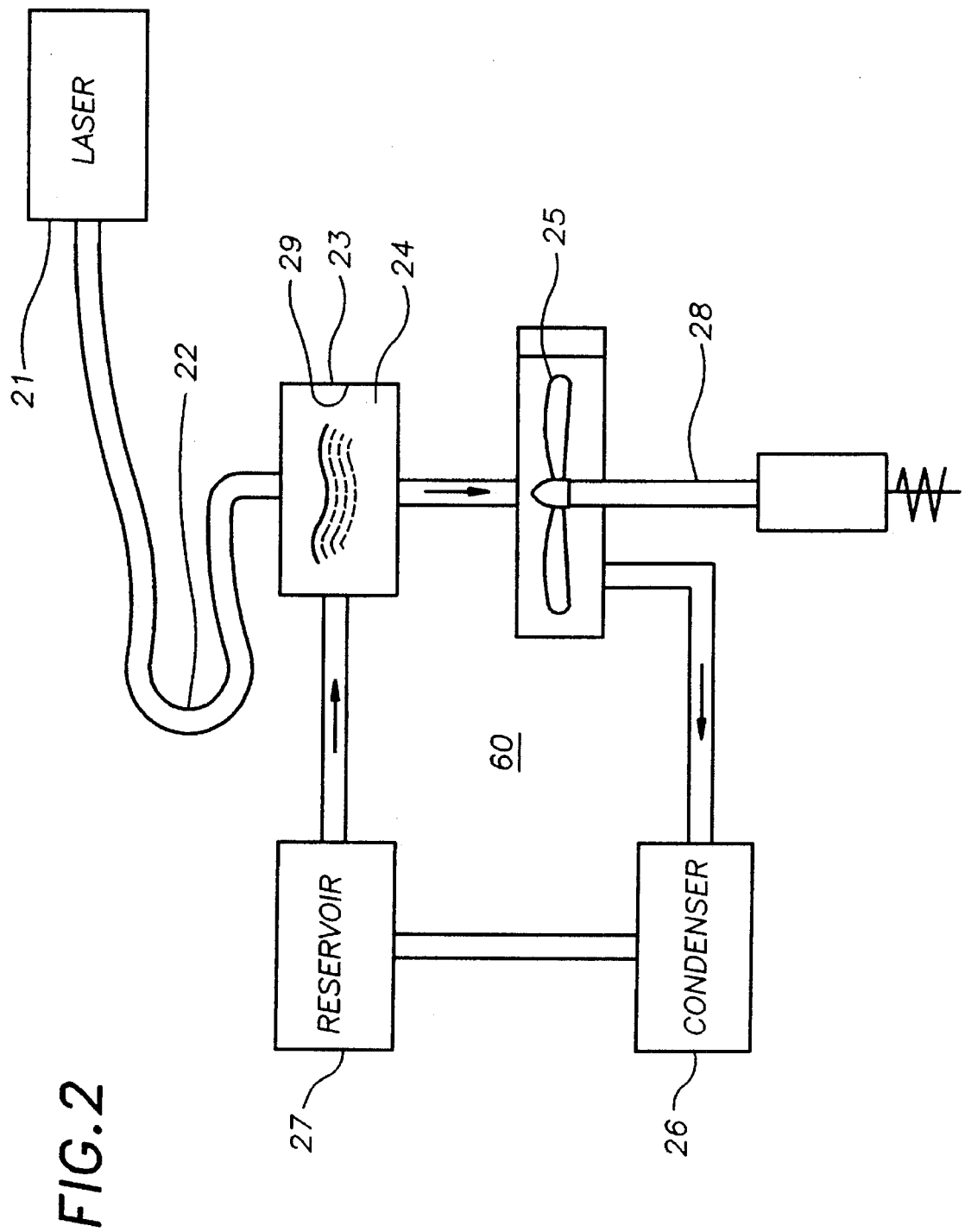
FIG. 2 shows a cross-sectional view of a fiberoptic linked micro turbine.

In FIG. 2, a micro turbine 60 is shown powered by a laser source 21 coupled through an optical fiber 22. Radiation from laser source 21 is transmitted through optical fiber 22 to an expansion chamber 23 containing work medium 24. As work medium 24 converts to a gas, it drives turbine blades 25 providing mechanical energy at rotating shaft 28. Upon exiting turbine blade 25 section, work medium 24 condenses in a condenser unit 26 and is pumped back into reservoir 27 and expansion chamber 23. Mechanical energy from rotating shaft 28 can be used for any desired purpose such as to mechanically remove [drilling out] plaque in clogged arteries. This example illustrates that continuous as well as pulsed laser radiation can be effectively used to power micro machines.

Work medium 24 can also be a gas, thus creating a gas micro turbine. In this case laser radiation as it leaves optical fiber 22 either is absorbed directly by gaseous work medium 24 causing it to expand rapidly and drive turbine blades 25. Alternatively, laser radiation exiting optical fiber 22 heats expansion chamber 23 via absorption by chamber walls 29, thus heating expansion chamber 23 and indirectly gaseous work medium 24. Under these conditions sufficient insulation of expansion chamber 24 will be necessary.

Dimensions for micro machines such as in the previous examples would depend on the application specifics. Typically dimensions would range from several millimeters for each dimension down to several 100 micrometers per dimension. In one embodiment, the micro device occupies a volume no greater than 200 mm$^3$. As manufacturing techniques for miniature devices develops further, even smaller dimensions will become commercially viable and within the scope of this invention. Lower size limits are related naturally to dimensions of components. Optical fibers, for example, have core dimensions typically from 10 to 200 micrometers, but smaller sizes are feasible.

Figure 3A:
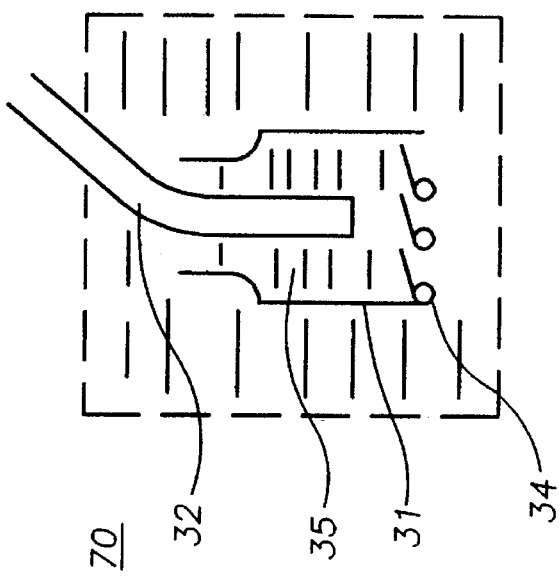
FIGS. 3A and 3B show a cross sectional view of a fiberoptic linked micro propulsion device.
Figure 3B:
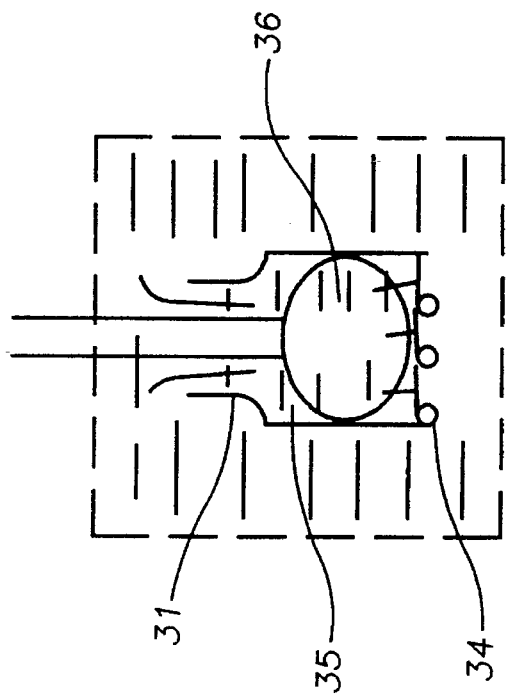

In FIG. 3, (upper section) a micro propulsion system 70 consisting of a chamber 31 linked by an optical fiber 32 to a pulsed laser source 33. Chamber 31 has inlet flaps 34 at one end of it which are open at the start of a cycle. Fluid within chamber 31 defines a work medium 35 for propulsion system 70. Laser source 33 is selected to radiate a wavelength that is strongly absorbed by work medium 35. As work medium 35 absorbs optical radiation exiting optical fiber 32, it vaporizes and creates a large differential pressure within chamber 31. As vaporized work medium 36 expands (lower portion of figure) it causes inlet flaps 34 to close. Excess work medium 35 is rapidly forced out of chamber 31 opposite flaps 34. As work medium 35 exits, chamber 31 is thrust forward into the medium surrounding it. Vaporized work medium 36 expands until internal pressure within chamber 31 approaches pressure levels of the surrounding medium. At this point, inlet flaps 34 open and a new supply of medium flows into chamber 31. Performed repetitively, chamber 31 and anything attached to it is propelled forward through the surrounding medium Recalling that water is a good working medium coupled with a laser source operating at a wavelength of 2.69 micrometers, one can imagine a device as described to carry an endoscope through an artery or other water filled vessel.

Figure 4:
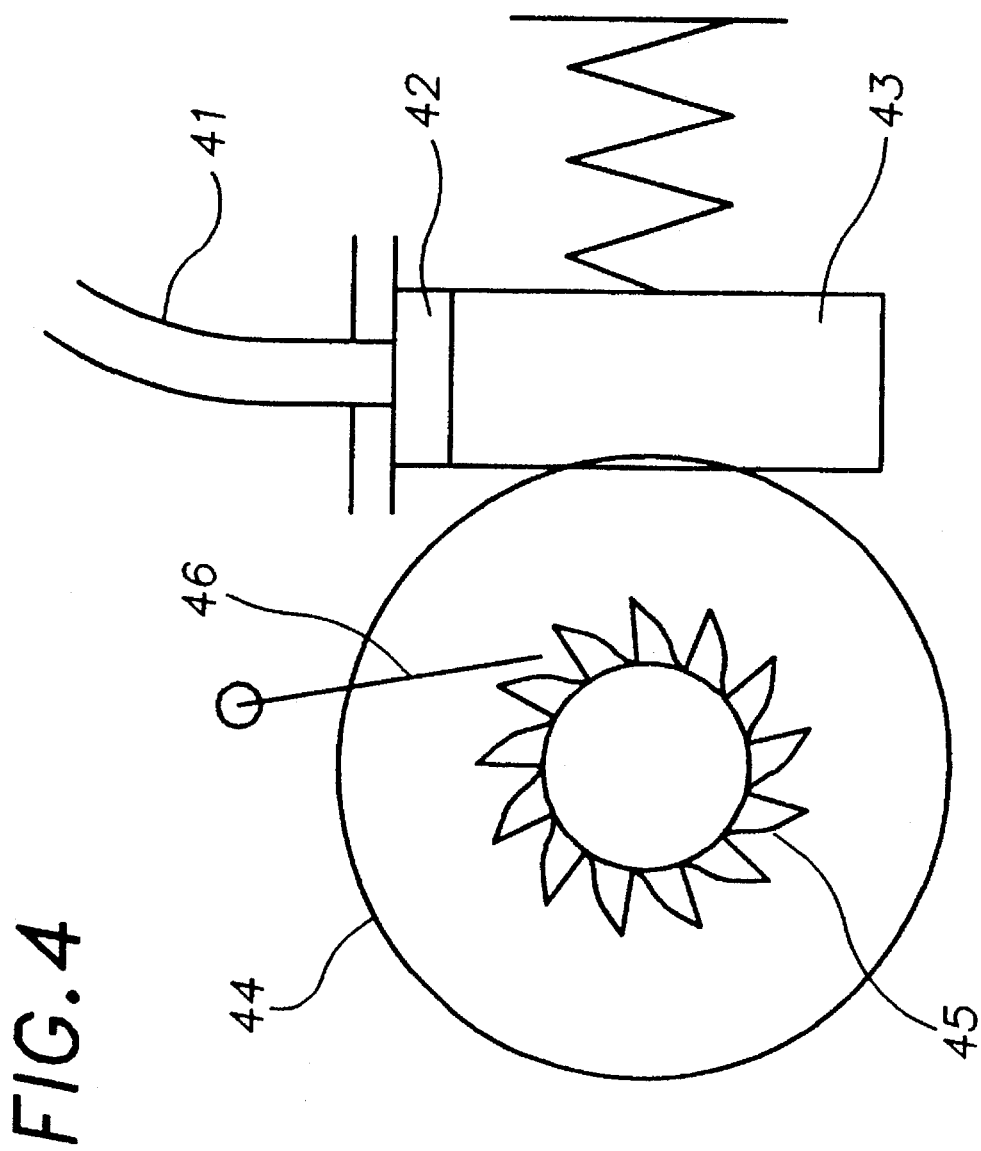
FIG. 4 shows, in a cross sectional view, a fiberoptic linked micro drive employing an optomechanical effect.

In another embodiment, an optical mechanical effect is employed in place of a thermodynamic effect to convert optical energy to mechanical energy. In FIG. 4, a solid medium 42 expands slightly as a laser radiation pulse exits optical fiber 41. As medium 42 expands, it turns wheel 44 by friction in a clockwise direction. Cog wheel 45 and pin 46 restrain wheel 44 from moving counterclockwise as medium 42 returns to its normal dimensions. Wheel 44 rotates generating a rotational force which can be harnessed for various applications. By pulsing a laser source at a reasonably fast repetition rate wheel 44 will rotate essentially continuously and can be used in an application similarly to the rotating shaft of the micro turbine described earlier.

In FIG. 5, another embodiment is depicted. Commonly, endoscopes are articulated using guide wires, positioned alongside a working channel or an image bundle of fibers. As designs elongate cannula placing distal ends farther from proximal ends and especially as cannula dimensions are reduced in mini endoscopes, manipulating with guide wires becomes more difficult.

A solution, using the present invention, is depicted in FIG. 5. A micro device 80, like a piston or a thrust pin 51, is incorporated at a distal end 52 of an endoscope's cannula 53. Thrust pin 51 is positioned in a small chamber 54 containing a work medium 55. As optical fiber 56 transmits optical energy from a laser to chamber 54. As optical energy strikes chamber 54, work medium 55 expands and pushes thrust pin 51 from its retracted position to its extended position. Thrust pin 51, as it extends, pushes on distal end 52 causing it to bend in a desired direction.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A micro device, occupying a volume no greater than 200 mm$^3$, comprising:

a chamber;

a thermodynamic medium within said chamber;

at least one optical fiber being optically connected to said chamber so as to transmit optical energy into said medium;

said at least one optical fiber being also optically connected to a source of optical radiation;

said source providing optical radiation of a wavelength which is absorbed by said medium;

said medium being able to expand rapidly upon absorption of said wavelength of said optical radiation;

a means for said medium to exit said chamber and for fresh medium to re-enter said chamber during each operating cycle of said device; and a reservoir of thermodynamic medium having access to said chamber so that fresh medium be available to re-enter said chamber each operating cycle.

2. A micro device according to claim 1, wherein said device occupies a total volume of less than 100 mm$^3$.

3. A micro device according to claim 1, wherein said source of optical radiation is a laser or a laser diode.

4. A micro device according to claim 1, wherein said medium comprises substantially water, said optical radiation has a wavelength of 2.69 μm, absorption of said radiation causing said water to vaporize, and said optical fiber has a silica core with no greater than 0.2 ppm of OH content in it.

5. A micro device according to claim 1, wherein said micro device frictions as a micro pump, said chamber being a first cylinder containing a first piston, said thermodynamic medium being a first medium, said device further comprising:

a second medium contained in a storage vessel;

said second medium to be metered by said micro pump;

a second cylinder and piston connected to said storage vessel, permitting flow of said second medium from said storage vessel to said second cylinder;

said second cylinder and piston mechanically connected to said first cylinder and piston such that during an operating cycle of said first cylinder and piston a quantity of said second medium is pumped from said storage vessel through said second cylinder to a pre-determined location.

6. A micro pump according to claim 5, wherein said second medium is a medical preparation which is to be delivered within a living animal to a specified site or organ.

7. A micro device according to claim 1, wherein said micro device functions as a micro turbine, said chamber being an expansion chamber containing said thermodynamic medium, said device further comprising:

a path for said medium including turbine blades at an exit of said chamber and a condenser before said medium returns to said reservoir; and said means for medium to exit and re-enter said chamber during each cycle comprising, having said medium vaporize in said chamber, exit said chamber, impart rotational energy to said turbine blades, condense in said condenser and return to said reservoir and said chamber.

8. A micro device according to claim 1, wherein said micro device functions as a micro propulsion system, said chamber being immersed in said medium and having inlet flaps at a forward end and a means for excess medium to be forced out of said chamber opposite said inlet flaps, said inlet flaps closing off said chamber when said medium is vaporized and lying open when fluid pressure of said medium within said chamber and outside said chamber are substantially equal.

9. A micro propulsion system according to claim 8, wherein said medium is a body fluid, and said system is connected to an endoscope or similar medical device and provides a means to pull said medical device through a selected body channel.

10. A micro device, occupying a volume no greater than 200 $^{mm3}$, comprising:

a solid medium in contact with a wheel:

at least one optical fiber being optically connected to said medium so as to transmit optical energy into said medium;

said at least one optical fiber being also optically connected to a source of optical radiation;

said source providing optical radiation as a series of pulses of a wavelength which is absorbed by said medium;

said medium being able to expand upon absorption of each pulse of said wavelength of said optical radiation;

said wheel having a means to obtain work from a circular motion of said wheel;

said wheel being mechanically attached to a means to restrain motion of said wheel to only one direction; and said medium, on expansion during each pulse of said radiation, turning by friction said wheel a fraction of its circumference.

11. A micro device according to claim 10, wherein said radiation source is a laser, said means to restrain motion of said wheel to one direction is a cog wheel and pin, and said wheel has an axle from which mechanical work can be obtained from said wheel's rotational motion.

12. A micro device according to claim 10, wherein said device occupies a total volume of less than 100 mm$^3$.

13. A micro device according to claim 10, wherein said source of optical radiation is a laser or a laser diode.

* * * * *